US012409537B2

(12) United States Patent
Grogan et al.

(10) Patent No.: US 12,409,537 B2
(45) Date of Patent: Sep. 9, 2025

(54) STAPLE HOLDING DEVICE

(71) Applicant: Acme Pounder, LLC, Phoenix, AZ (US)

(72) Inventors: Jonathan Grogan, Morrisville, VT (US); Alexander Bornemann, Duxbury, VT (US)

(73) Assignee: ACME GROUNDER, LLC, Phoenix, AZ (US)

( * ) Notice: Subject to any disclaimer, the term of this patent is extended or adjusted under 35 U.S.C. 154(b) by 0 days.

(21) Appl. No.: 18/301,163

(22) Filed: Apr. 14, 2023

(65) Prior Publication Data

US 2023/0364764 A1 Nov. 16, 2023

Related U.S. Application Data

(60) Provisional application No. 63/330,888, filed on Apr. 14, 2022.

(51) Int. Cl.
*B25C 3/00* (2006.01)

(52) U.S. Cl.
CPC .................................... *B25C 3/006* (2013.01)

(58) Field of Classification Search
None
See application file for complete search history.

(56) References Cited

U.S. PATENT DOCUMENTS

| | | | | | |
|---|---|---|---|---|---|
| 493,758 | A * | 3/1893 | Davidson | B25C 3/008 | 81/44 |
| 4,966,056 | A * | 10/1990 | Miller | B25C 3/008 | 227/135 |
| 2007/0158383 | A1 * | 7/2007 | Cheng | B25C 5/06 | 227/30 |
| 2008/0156844 | A1 * | 7/2008 | Braganza | B25C 5/06 | 227/120 |
| 2019/0101147 | A1 * | 4/2019 | Fairbanks | F16B 15/08 | |
| 2021/0178566 | A1 * | 6/2021 | Captarencu | B25C 5/1658 | |
| 2022/0212328 | A1 * | 7/2022 | Craven | B25B 15/004 | |
| 2022/0362915 | A1 * | 11/2022 | Dumph | B25C 5/11 | |

* cited by examiner

*Primary Examiner* — Tanzim Imam
(74) *Attorney, Agent, or Firm* — KW Law, LLP

(57) ABSTRACT

The staple holding devices of the present application may comprise a body defining a first axis A-A, a second axis B-B and a third axis C-C along the length of the body between a first end and a second end. The body may comprise a plurality of staple channels defined through the body in the first axis A-A, the second axis B-B, and the third axis C-C. The body can also include a through hole at the first end. Each of the plurality of staple channels can include a wire guide groove. Each of the wire guide grooves may be defined in the bottom of the body. The first width of the wire guide groove can be less than a second width of the staple channel.

12 Claims, 26 Drawing Sheets

STAPLE HOLDING DEVICE

CROSS REFERENCE TO RELATED APPLICATIONS

The present application claims priority to and the benefit of U.S. Provisional Patent Application No. 63/330,888, filed Apr. 14, 2022 and entitled Staple Holding Device, the entire contents of which are herein incorporated by reference for any purpose.

FIELD

The present disclosure relates to a tool for holding fasteners. More particularly, the present disclosure relates to a flexible tool for holding staples to secure ground wires.

BACKGROUND

Ground wires must be affixed to utility poles in a series along the height of the utility pole. Where these utility poles are wood, fasteners, such as staples, may be used to secure ground wires to the utility poles. Given the height and environmental conditions faced by lineman securing ground wires to utility poles, there is a need for a tool to make this process more efficient.

SUMMARY

In various embodiments, the staple holding devices of the present application may comprise a body defining a first axis A-A, a second axis B-B, and a third axis C-C along the length of the body between a first end and a second end. The body may comprise a plurality of staple channels defined through the body in the first axis A-A, the second axis B-B, and the third axis C-C. The body can also include a through hole at the first end. Each of the plurality of staple channels can include a wire guide groove. Each of the wire guide grooves may be defined in the bottom of the body. The first width of the wire guide groove can be less than a second width of the staple channel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full and/or any other possible attachment option. Additionally, any reference to without contact (or similar phrases) may also include reduced contact or minimal contact.

In various embodiments, the staple holding device or staple stick disclosed herein may be configured to retain, and provide for efficient installation, of fasteners or staples in utility pole and other installation applications. More specifically, the systems may be configured to manage staples, provide for staple alignment and spacing, and facilitate engagement by a hammer or other fastener or staple driving device. The staple sticks described herein may be flexible and sufficiently rigid to receive and hold staples or fasteners for installation, engage ground wires, and/or the like.

Figure 1:
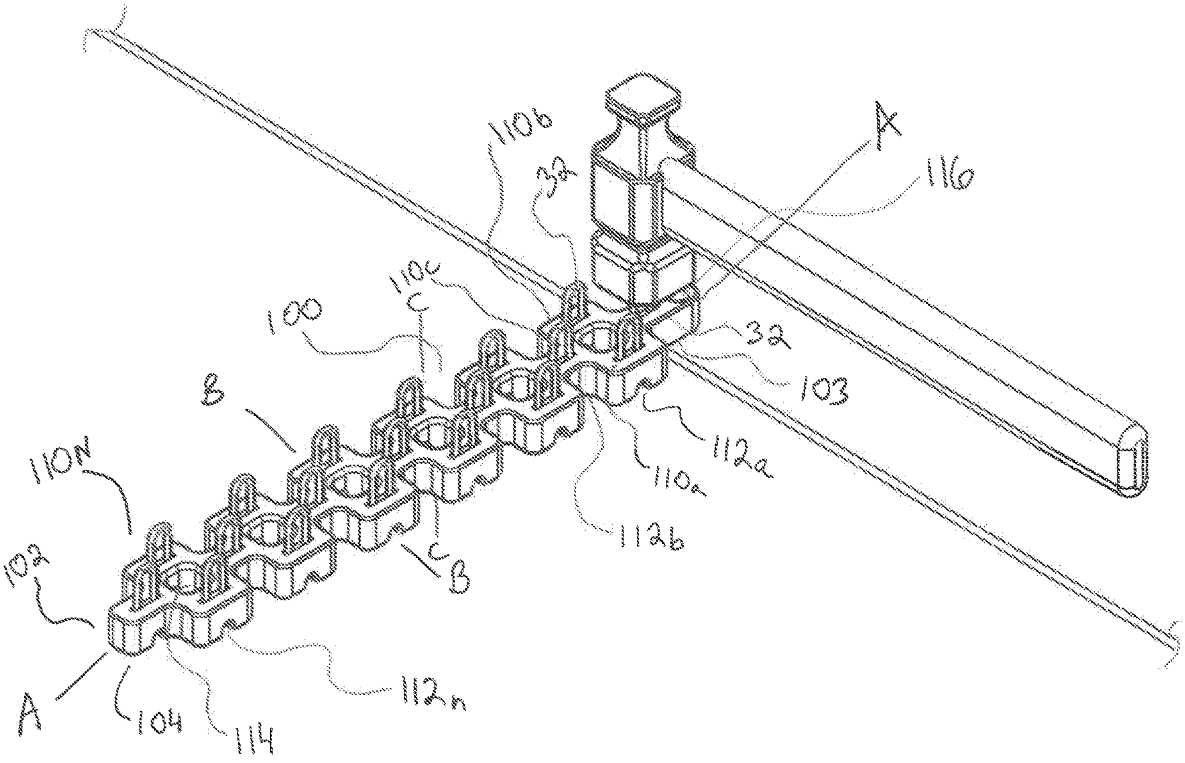
FIG. 1 illustrates a perspective view of a staple holding device including staples, in accordance with various embodiments.

In various embodiments and with reference to FIG. 1, a staple holding device or staple stick 100 comprises a body 102. Body 102 includes a through hole 116 at a first end 103. Staple stick 100 may comprise a plurality of staple channels 110*a*, 110*b*, 110*c*, 110*n*, and/or the like. Staple channel 110*a* may be defined through body 102. Staple stick 100 may also comprise a plurality of wire guide grooves 112*a*, 112*b*, 112*n*, and/or the like. Wire guide groove 112*a* may be defined in a bottom surface of body 102. In various embodiments, a first width of wire guide groove 112*a* is less than a second width of the staple channel 110*a*.

Body 102 body can define a first axis A-A. First axis A-A defines the longitudinal axis along the length of body 102. Staple 32 is perpendicular to first axis A-A in a first direction.

Body 102 body can also define a second axis B-B. Second axis B-B defines a first lateral axis along the width of body 102. Staple 32 is perpendicular to second axis B-B in a second direction.

Body 102 body can also define a third axis C-C. Third axis C-C defines a second lateral axis along the height of body 102. Staple 32 is parallel to third axis C-C in a third direction.

Figure 2A:
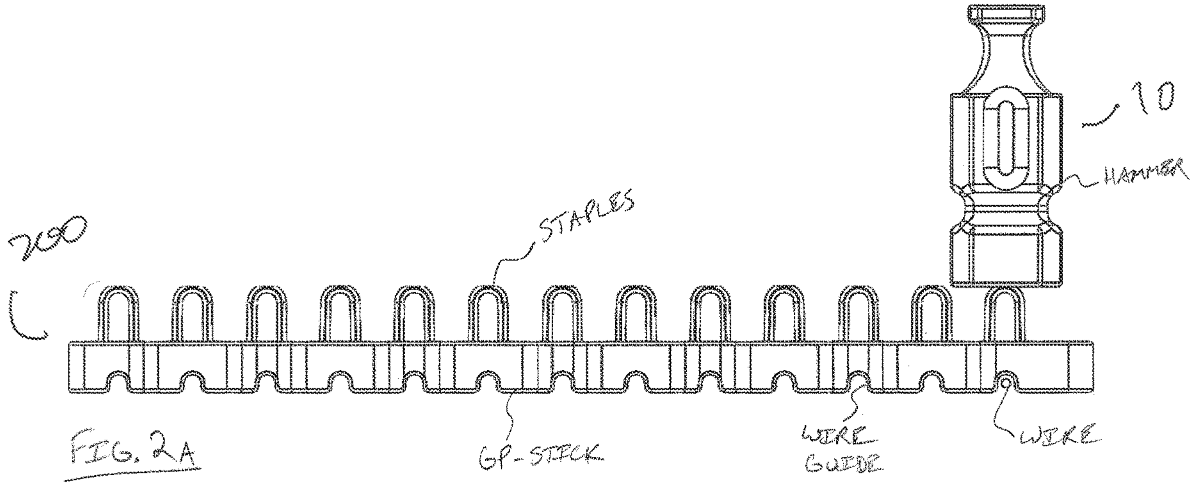
FIG. 2A illustrates a front view of a staple holding device, in accordance with various embodiments.
Figure 2B:
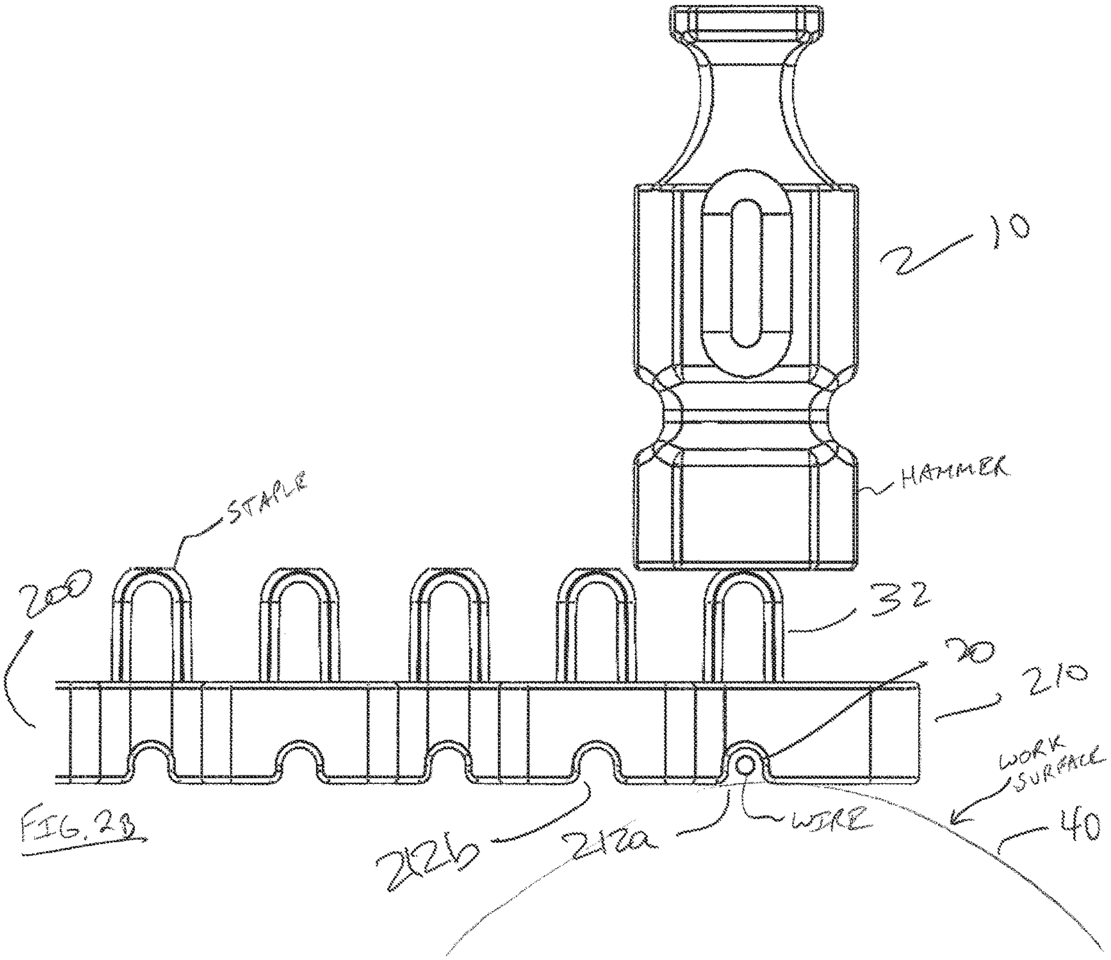
FIG. 2B illustrates a front view of a staple holding device on a worksurface, in accordance with various embodiments.

In various embodiments and with reference to FIGS. 2A-2B, staple stick 200 may be installed on a work surface 40. Staple stick 200 may engage a ground wire 20 via wire guide groove 212*a*. Staple 32 may be driven through body 210 by hammer 10. Staple 32 may be driven into work surface 40 (e.g., a wooden utility pole) by hammer 10 to secure ground wire 20 to work surface 40. In this regard, staple stick 200 may index on ground wire 20 to secure ground wire 20 to work surface 40.

Figure 3:
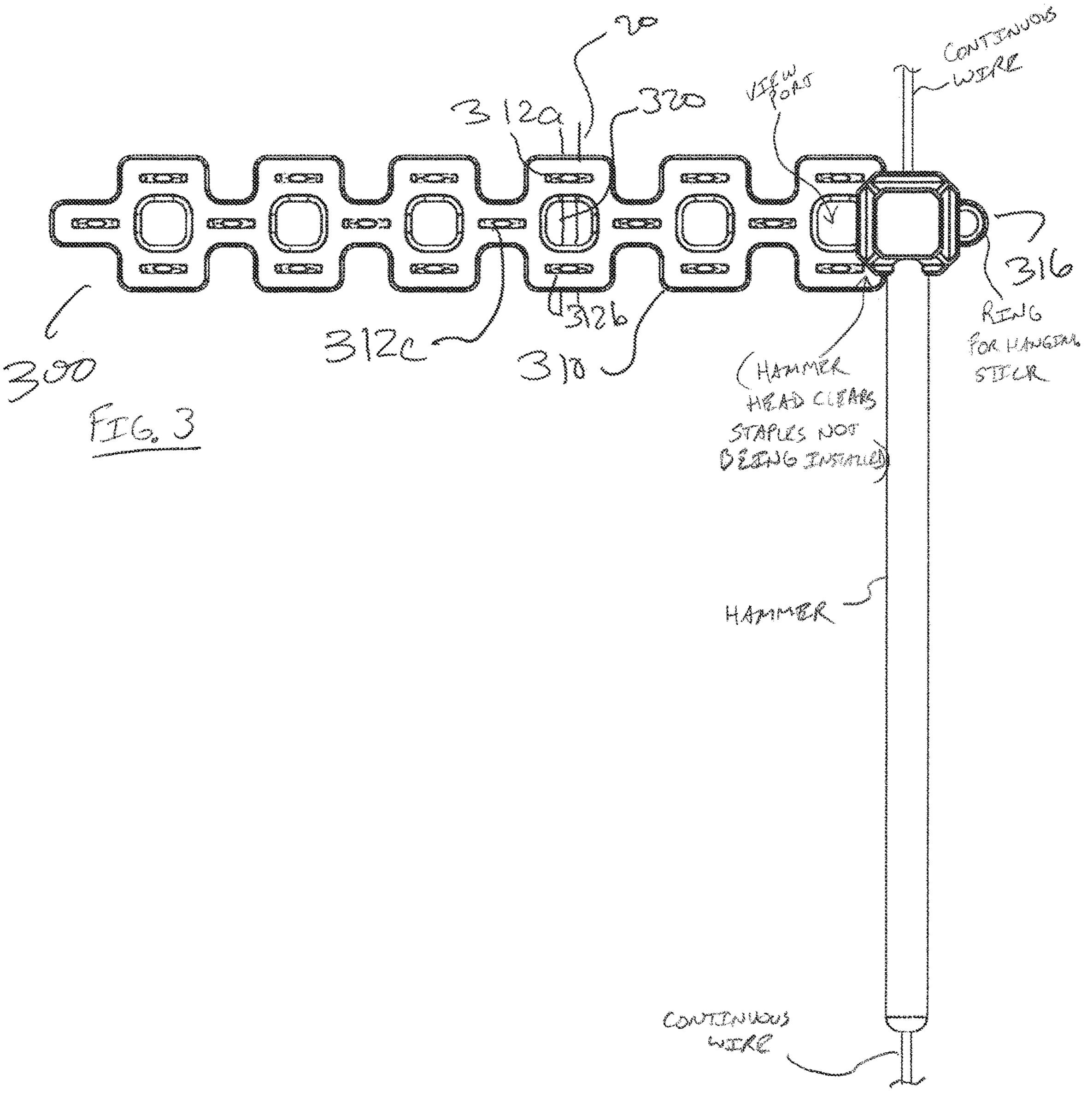
FIG. 3 illustrates a top view of a staple holding device, in accordance with various embodiments.
Figure 4A:
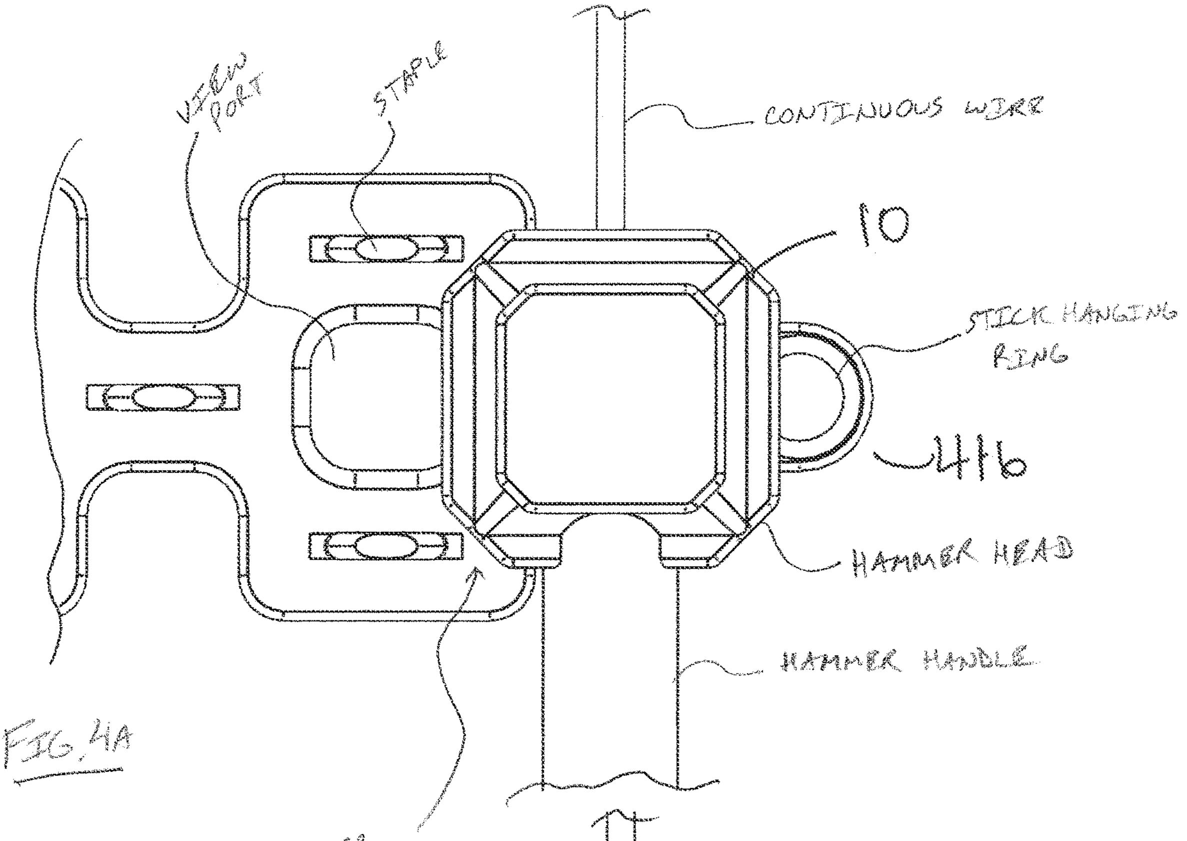
FIG. 4A illustrates a tope detail view of a staple holding device with a hammer, in accordance with various embodiments.
Figure 4B:
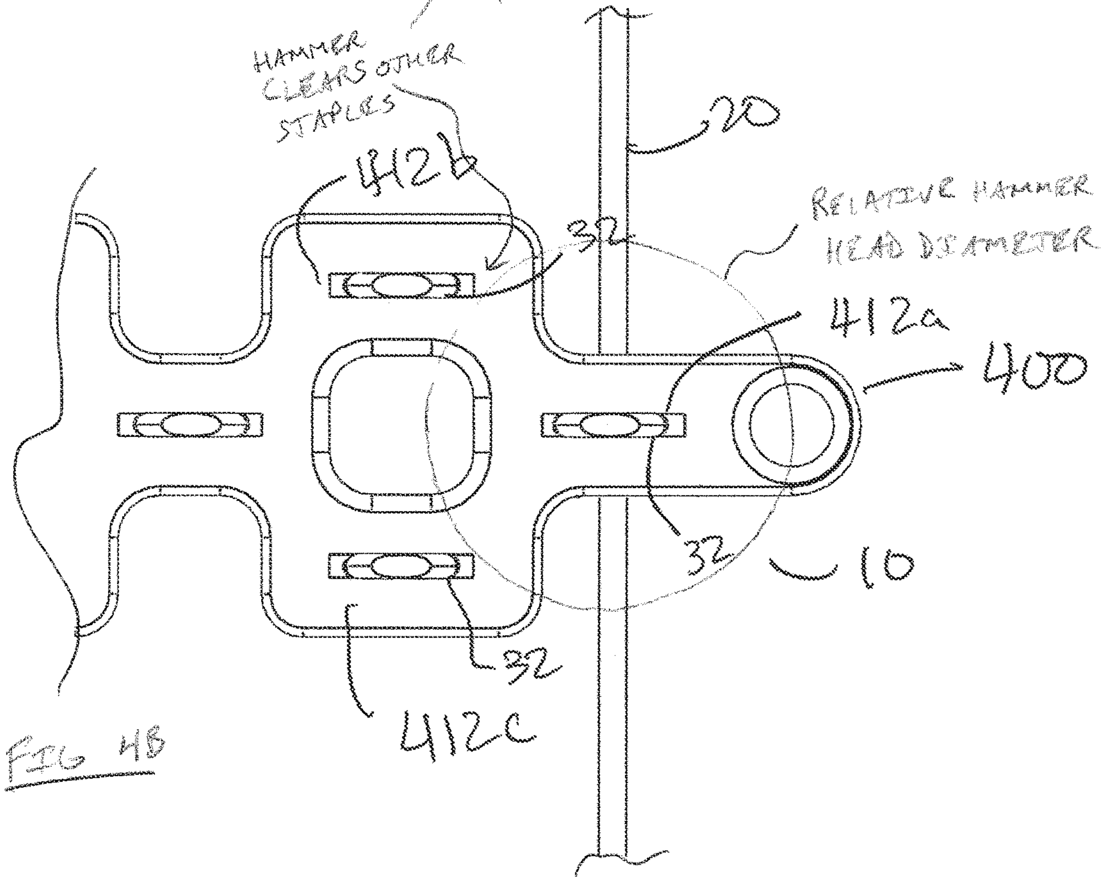
FIG. 4B illustrates a top detail view showing relative hammer head spacing, in accordance with various embodiments.
Figure 5A:
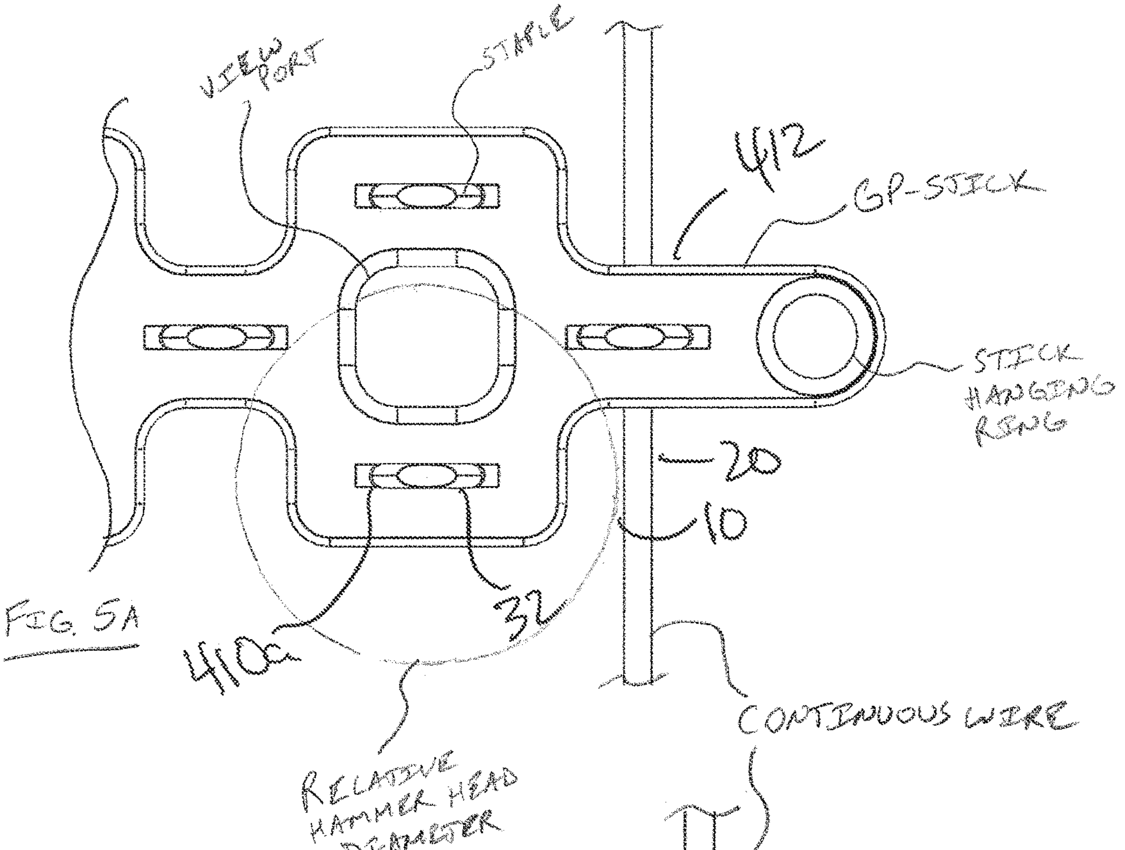
FIGS. 5A-5B illustrate top detail views of a staple holding device showing relative hammer head spacing of various staple grooves, in accordance with various embodiments.
Figure 5B:
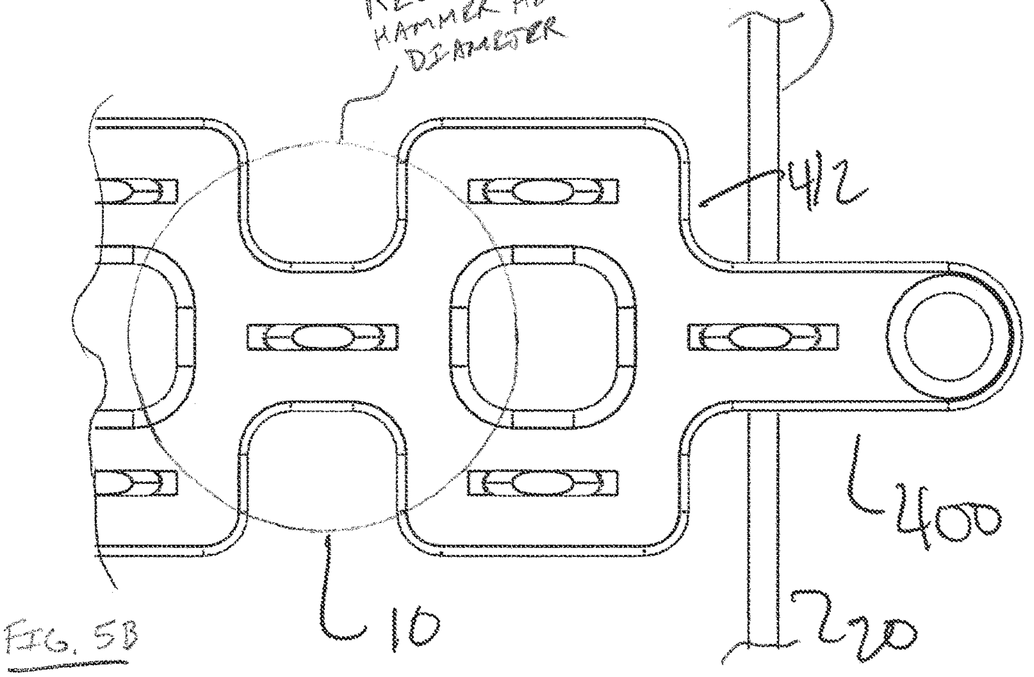

In various embodiments and with reference to FIG. 3, staple stick 300 may comprise and/or define a view port 320 through body 312. View port 320 may be defined between staple channel 312*a* and staple channel 312*b*, allowing a user to view ground wire 20 when staple stick 300 is installed on ground wire 20. This allows the user to ensure that staple stick 300, staple channels 312*a* and 312*b*, and ground wire 20 are properly aligned before a staple is driven through staple stick 300. Moreover, staple stick 300 may comprise a ring or through hole 316 at an end of staple stick 300. Ring 316 may allow staple stick 300 to be hung from a hook or belt.

In various embodiments and with reference to FIGS. 4A through 7B, the staple channels 410*a*, 410*b*, and 410*c*, of staple stick 400 may be sufficiently spaced to allow for engagement of staple 32 without interference from an adjacent staple 32. With specific reference to FIG. 4A, the diameter of the head of hammer 10 is sufficiently large to engage staple 32 in staple channel 412*a*, while generally avoiding staples 32 in staple channels 412*b* and 412*c*. This offset allows a user to efficiently drive a first staple 32 without regard for striking a second staple 32 that is not aligned with ground wire 20.

Figure 6A:
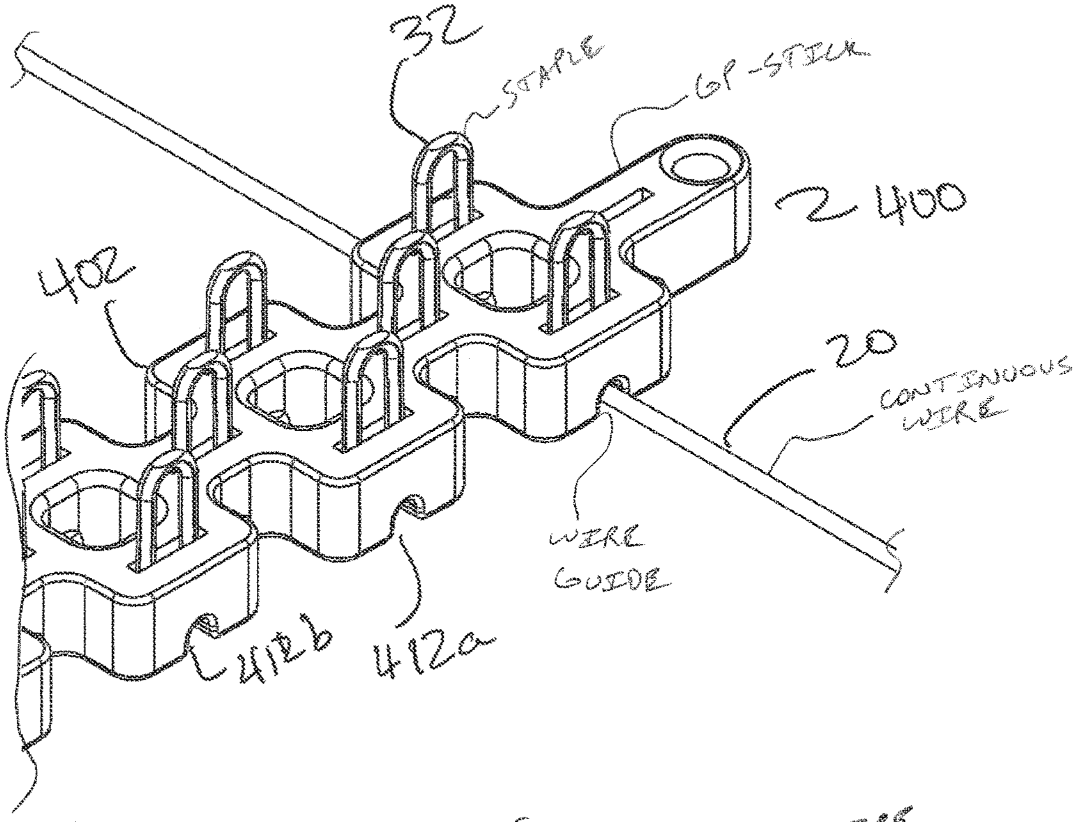
FIG. 6A illustrates a top perspective view of a portion of a staple holding device, in accordance with various embodiments.
Figure 6B:
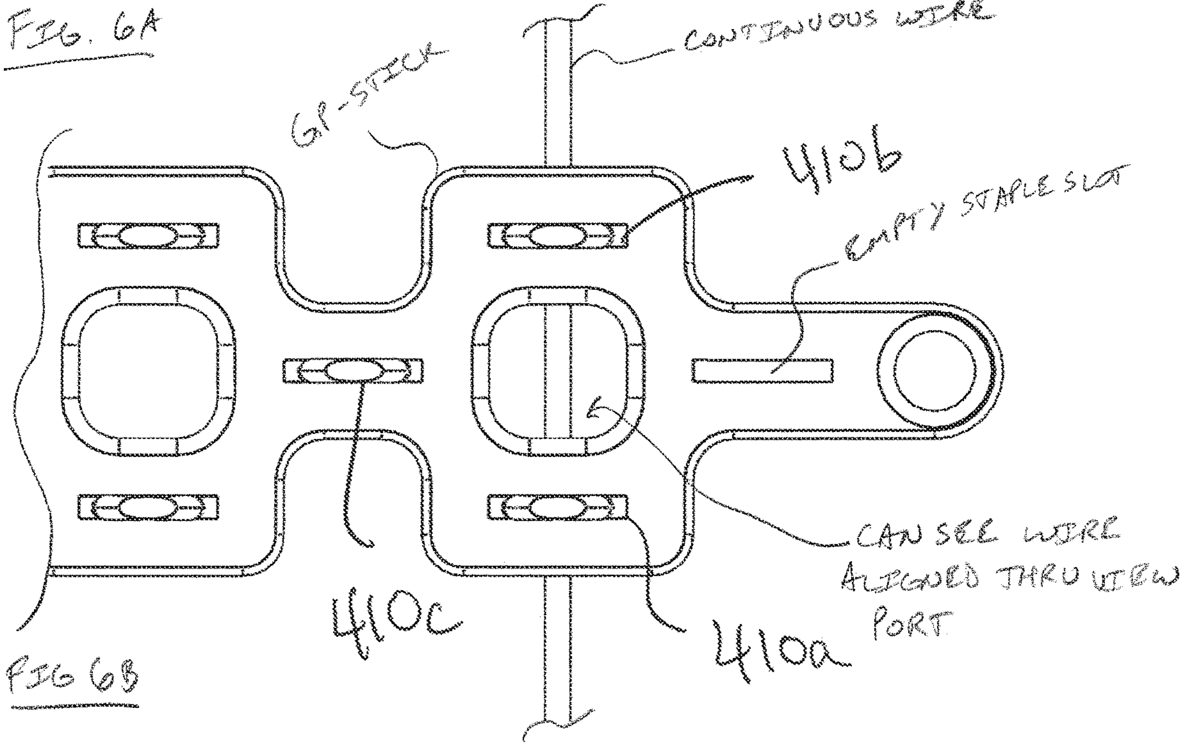
FIG. 6B illustrates a top view of a portion of a staple holding device, in accordance with various embodiments.
Figure 7A:
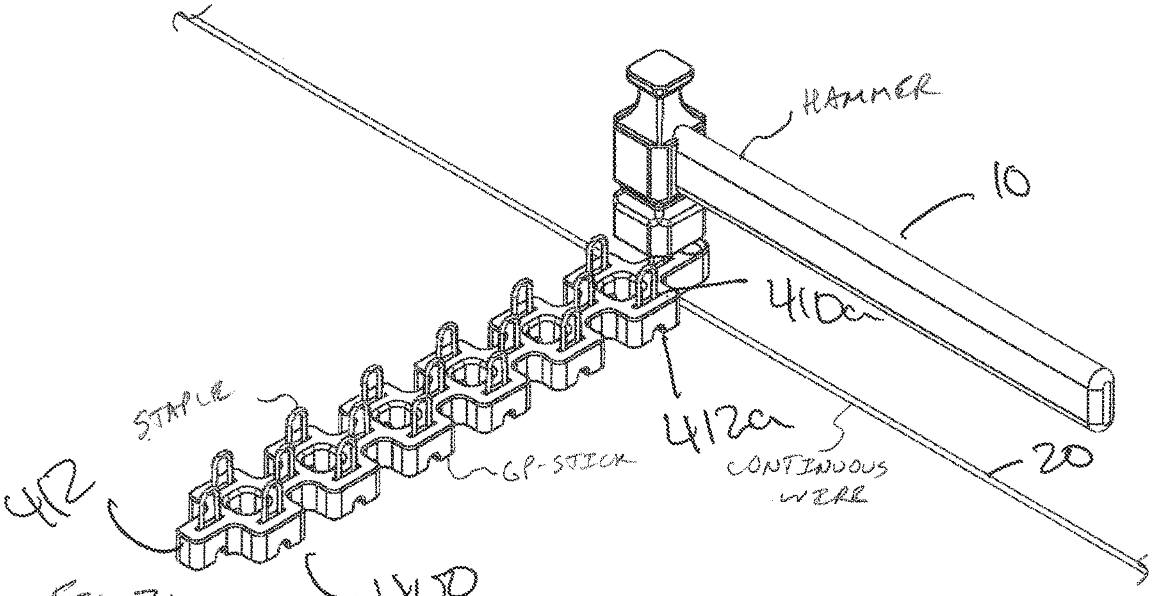
FIGS. 7A-7B illustrate top perspective views of a staple holding device with a staple being driven by a hammer, in accordance with various embodiments.
Figure 7B:
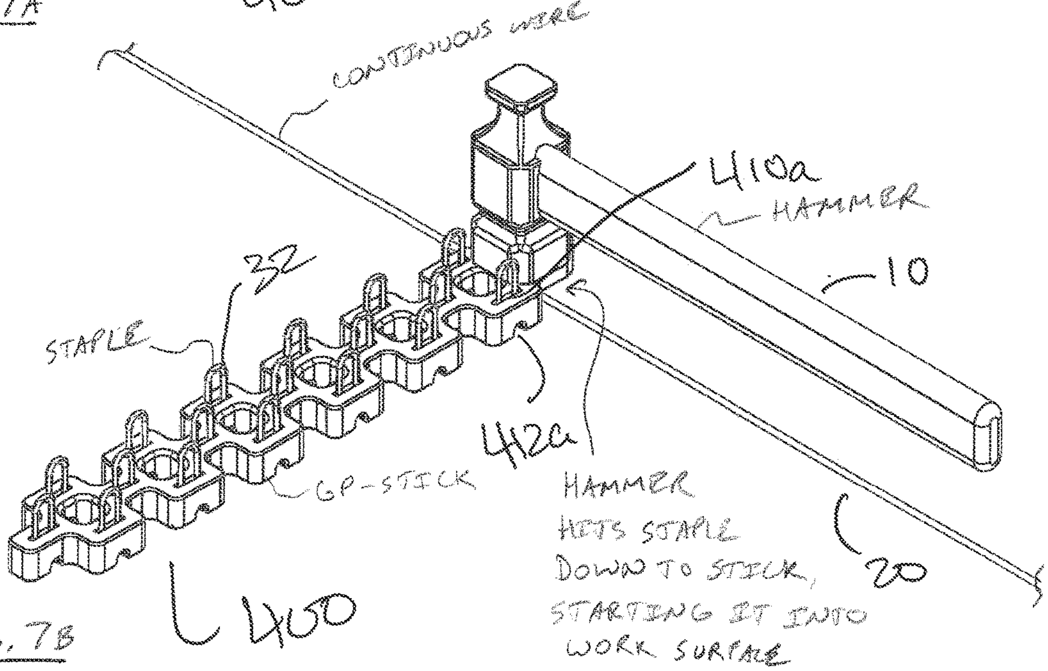

In various embodiments and with specific reference to FIG. 6A, wire guide groove 412*a* may be defined as an archway. In this regard, wire guide groove 412*a* may define two substantially parallel walls that are joined at a top of the archway by a curved surface or semicircle. The distance between the substantially parallel walls may define a diameter of the semicircle that may approximate the diameter of ground wire 20. In other embodiments, 412*b* may define a semicircle that has a diameter that approximates the diameter of ground wire 20. In this regard, either wire groove channel 412*a* and/or wire groove 412*b* may be configured to index on, slide along, and/or locate ground wire 20. Wire guide groove 412*a*, 412*b*, and/or body 412 may be made of a sufficiently ductile material that wire guide groove 412*a* may be sufficiently deformable to receive a range of diameters of ground wire 20.

Figure 8:
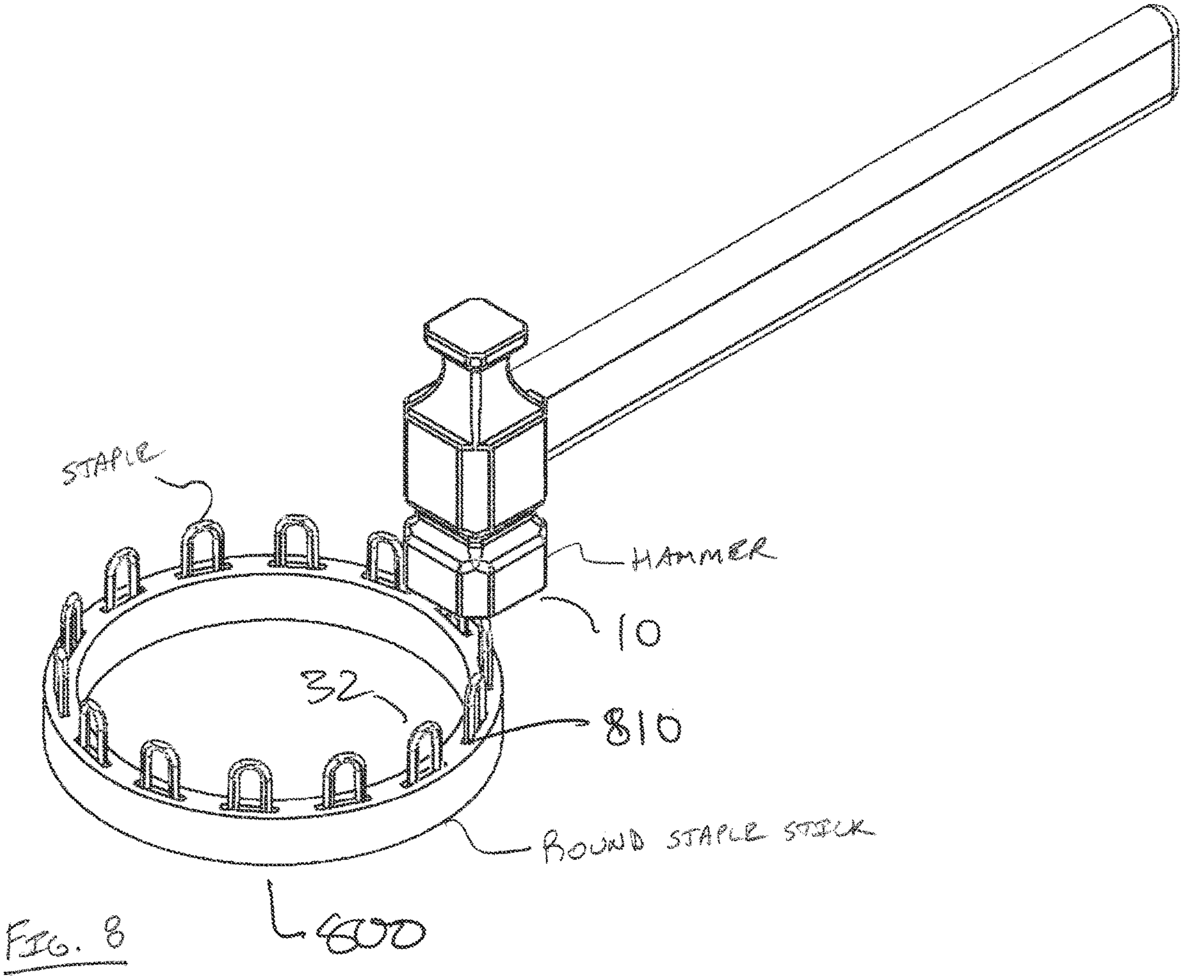
FIG. 8 illustrates a top perspective view of a second staple holding device, in accordance with various embodiments.
Figure 9:
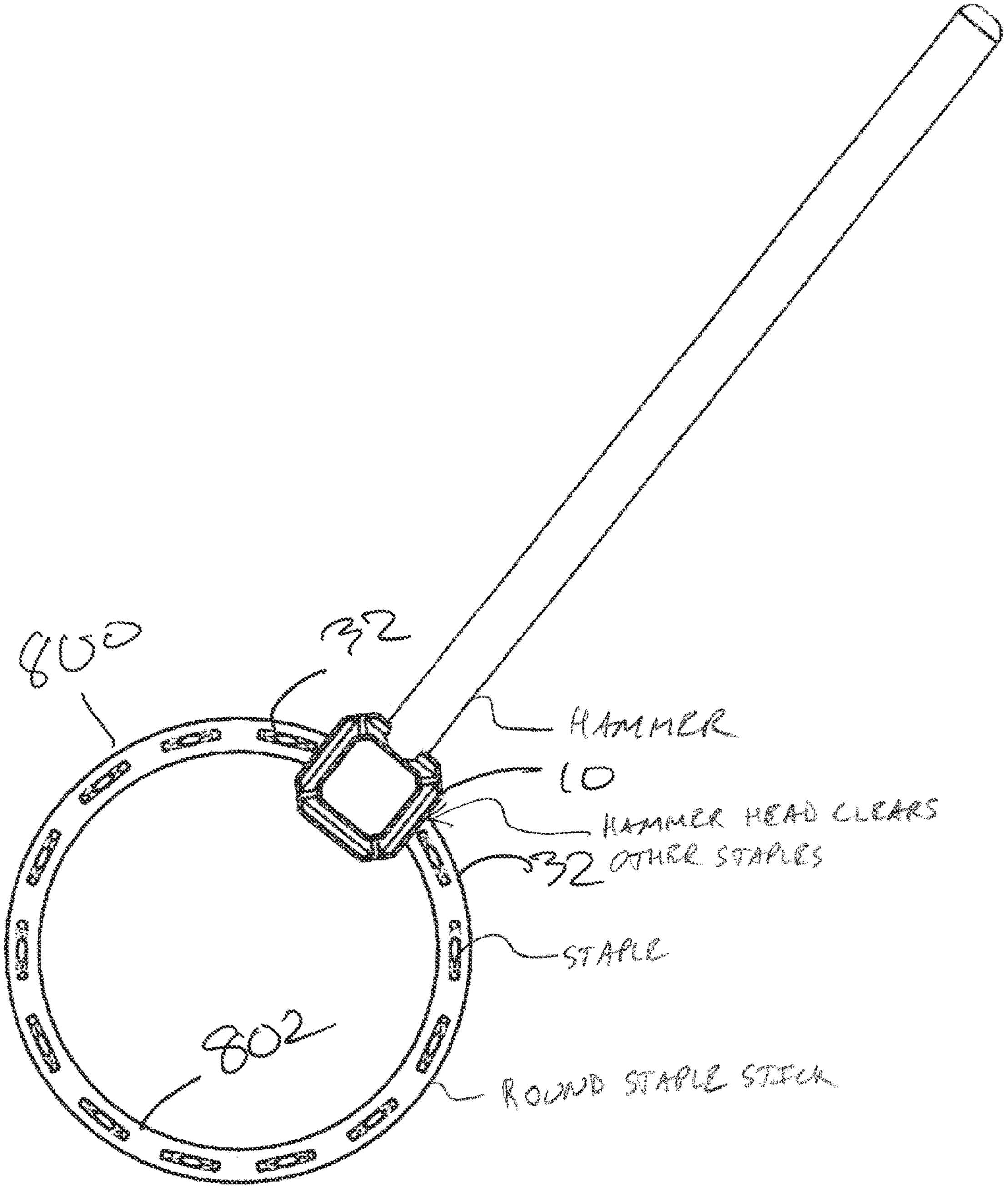
FIG. 9 illustrates a top view of a second staple holding device showing relative hammer head spacing, in accordance with various embodiments.
Figure 10:
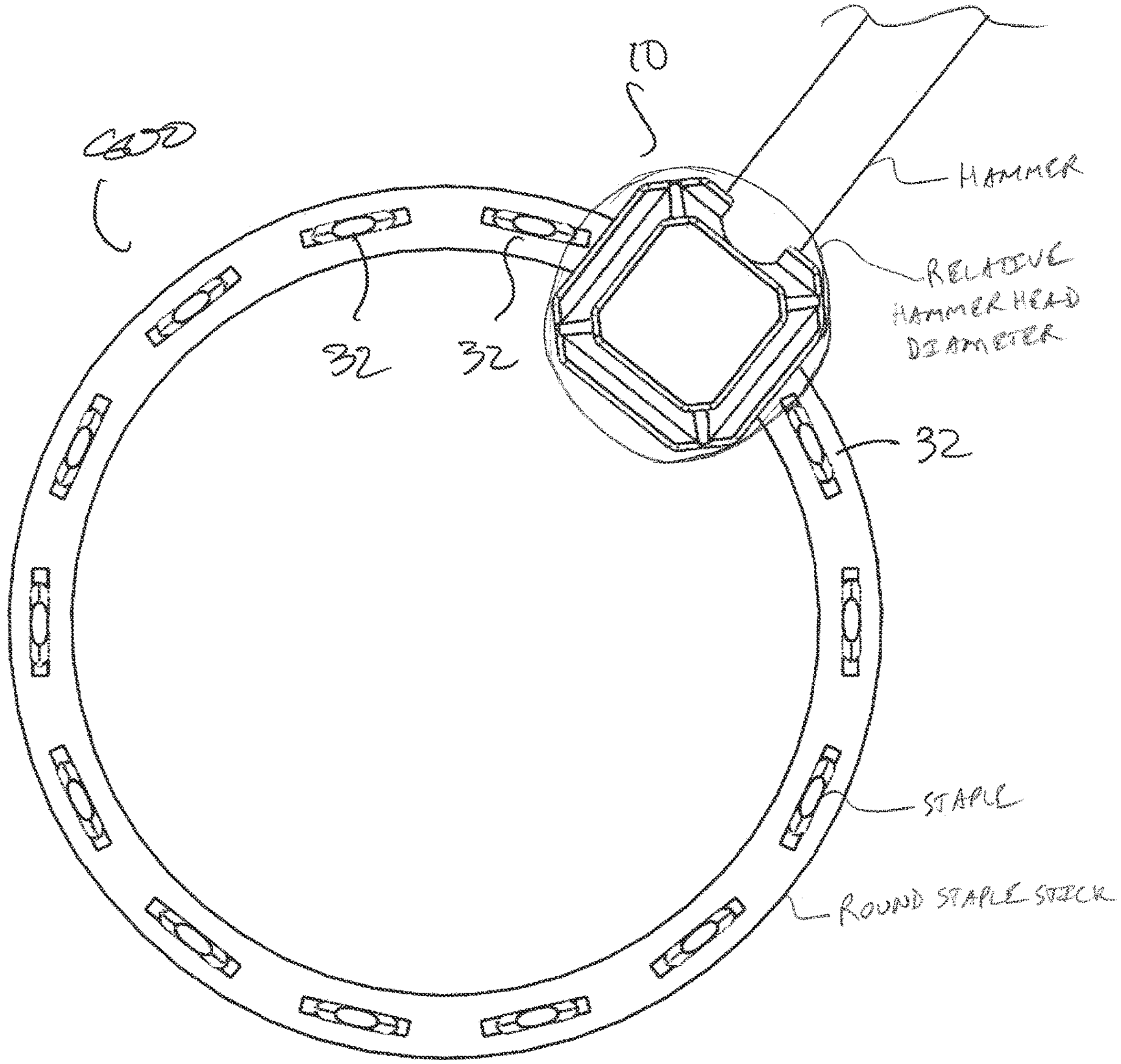
FIG. 10 illustrates a top detail view of a second staple holding device showing relative hammer head spacing, in accordance with various embodiments.

In various embodiments and with reference to FIGS. 8-10, staple stick 800 may be configured as a round staple stick. Staple stick 800 may include a plurality of staple channels 810 distributed about the diameter of staple stick 800. Moreover, and as described herein, each staple channel 810 may comprise a wire guide channel. Moreover, when installed in staple stick 800, staples 32 may be sufficiently spaced from one another to allow each staple 32 to be individually struck by hammer 10 without interference from an adjacent staple.

Figure 11:
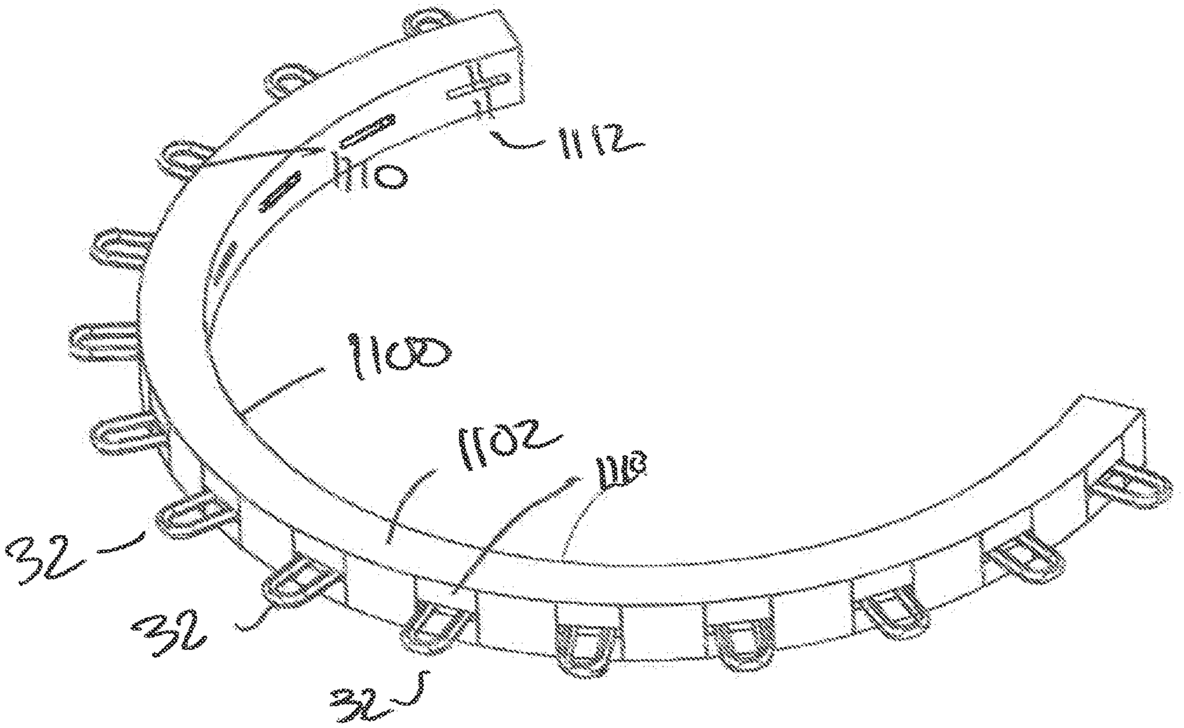
FIG. 11 illustrates a front perspective view of a third staple holding device, in accordance with various embodiments.
Figure 12:
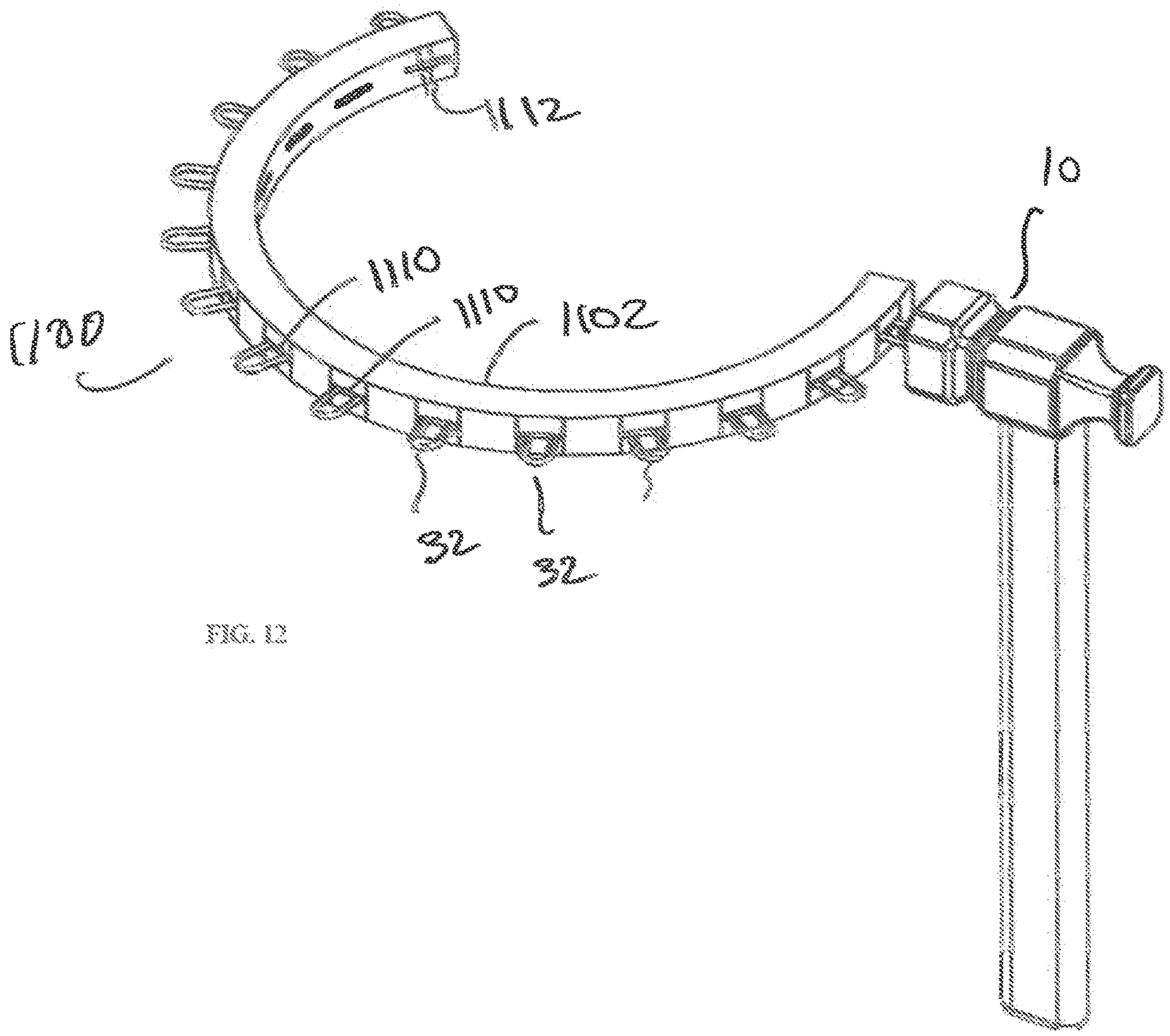
FIG. 12 illustrates a front perspective view of a third staple holding device with a hammer, in accordance with various embodiments.
Figure 13:
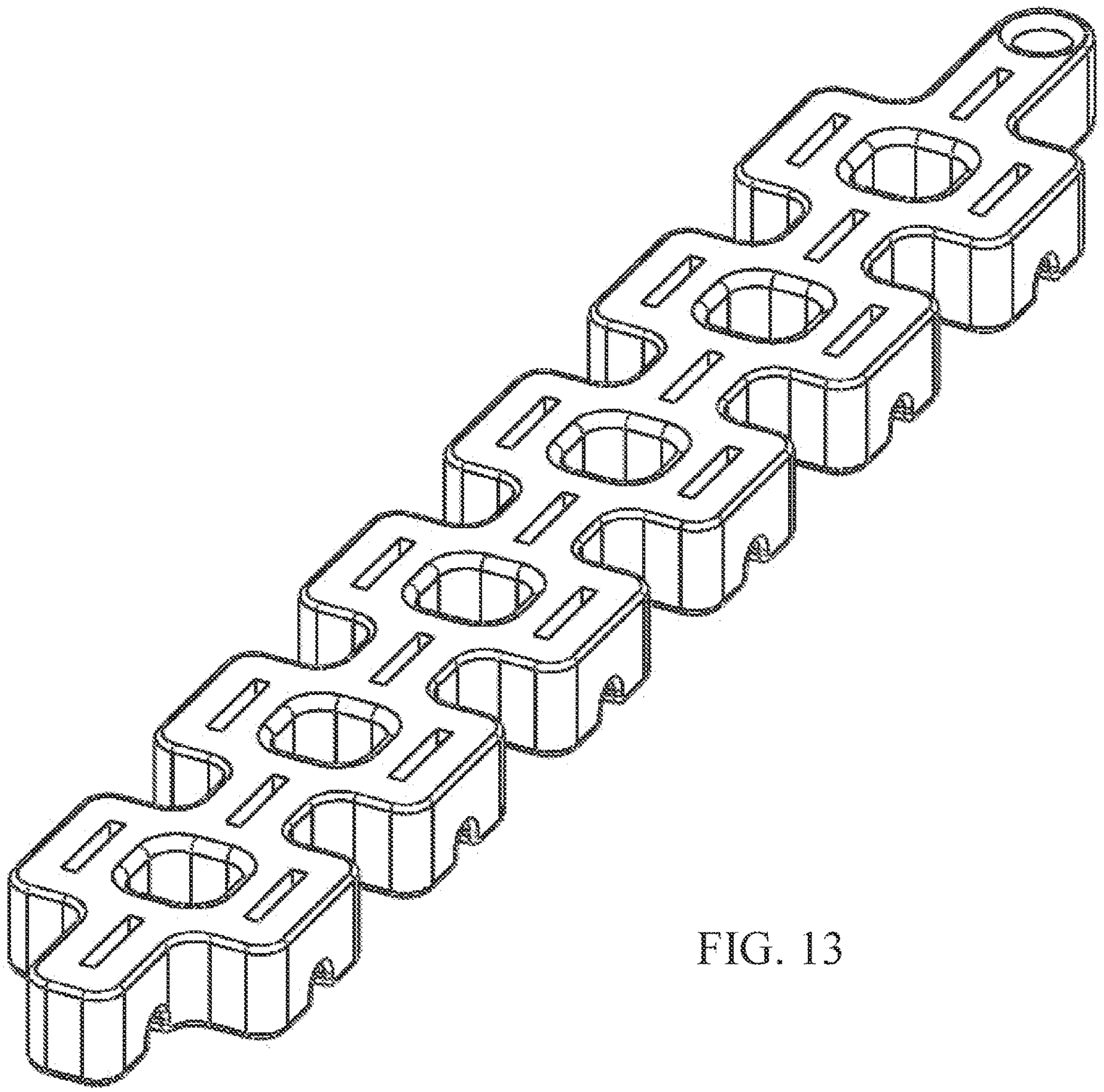
FIG. 13 is a top front perspective view of a staple holding device, in accordance with the present disclosure.
Figure 14:
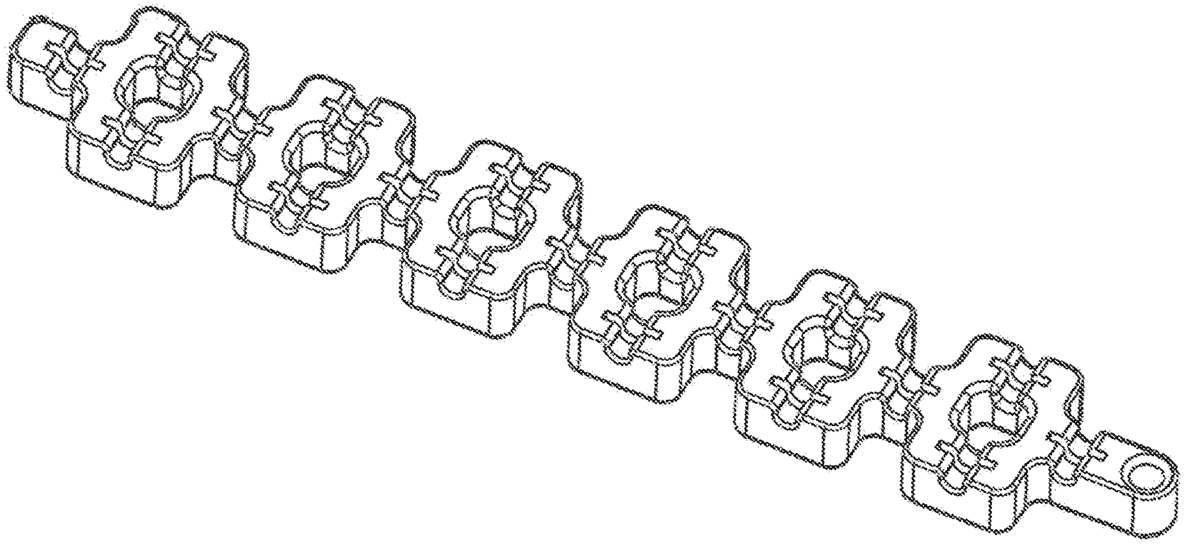
FIG. 14 is a bottom perspective view of FIG. 13.
Figure 15:
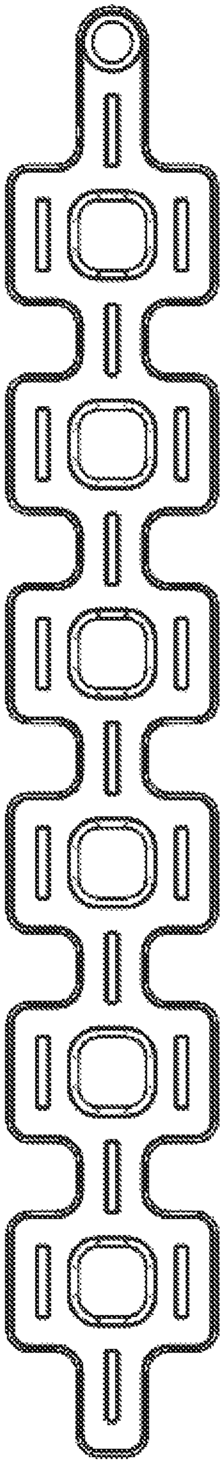
FIG. 15 is a top view of FIG. 13.
Figure 16:
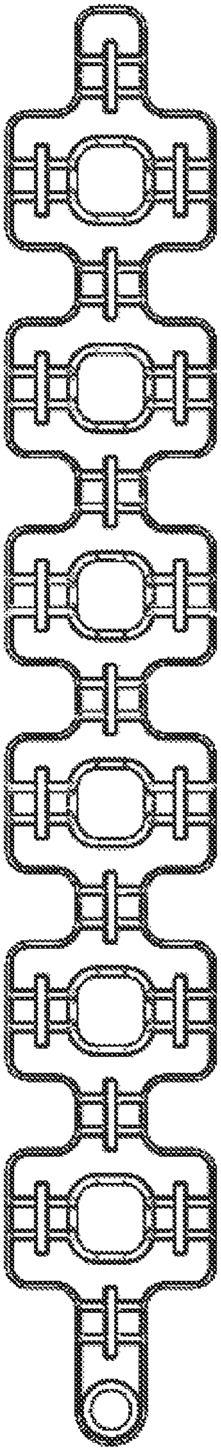
FIG. 16 is a bottom view of FIG. 13.
Figure 17:
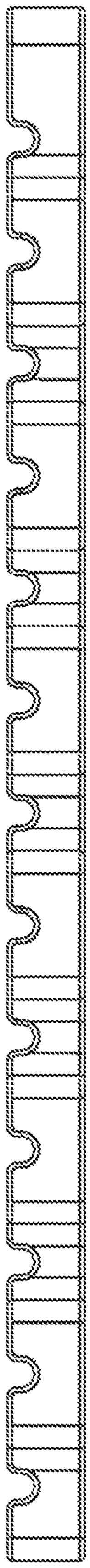
FIG. 17 is a first side view of FIG. 13.
Figure 18:
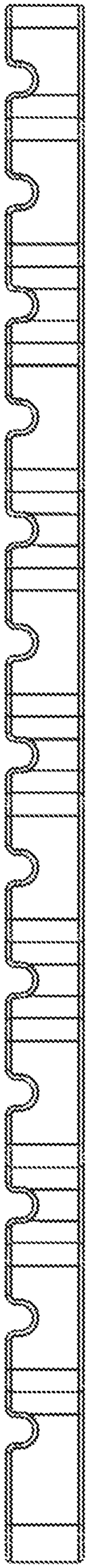
FIG. 18 is a second side view of FIG. 13.
Figure 19:
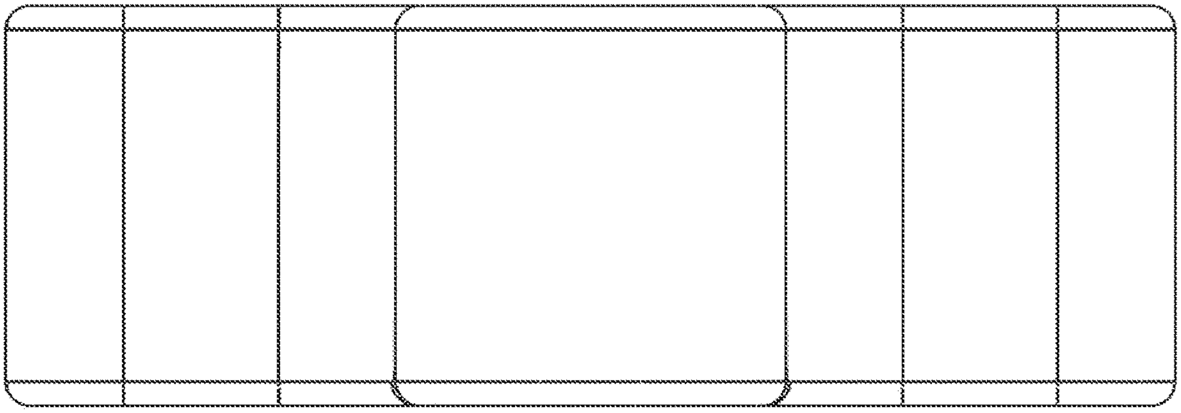
FIG. 19 is a front of FIG. 13.
Figure 20:
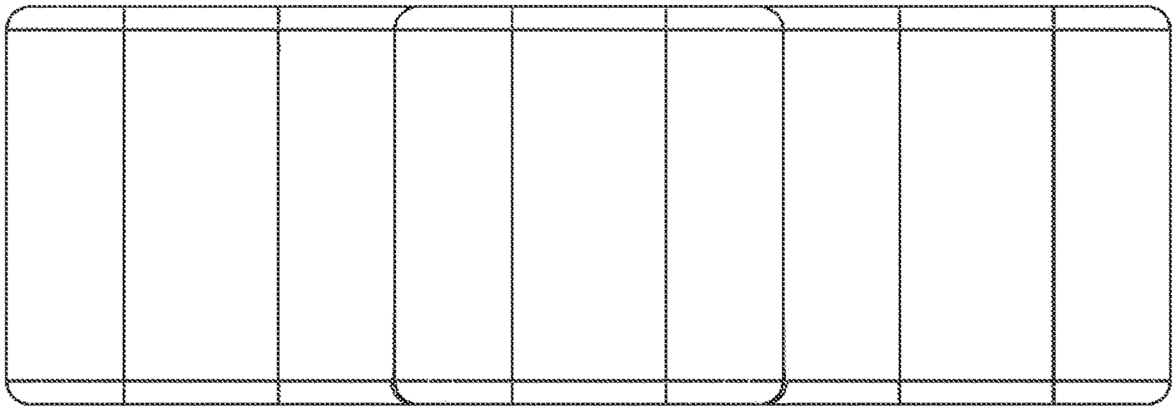
FIG. 20 is a back of FIG. 13.
Figure 21:
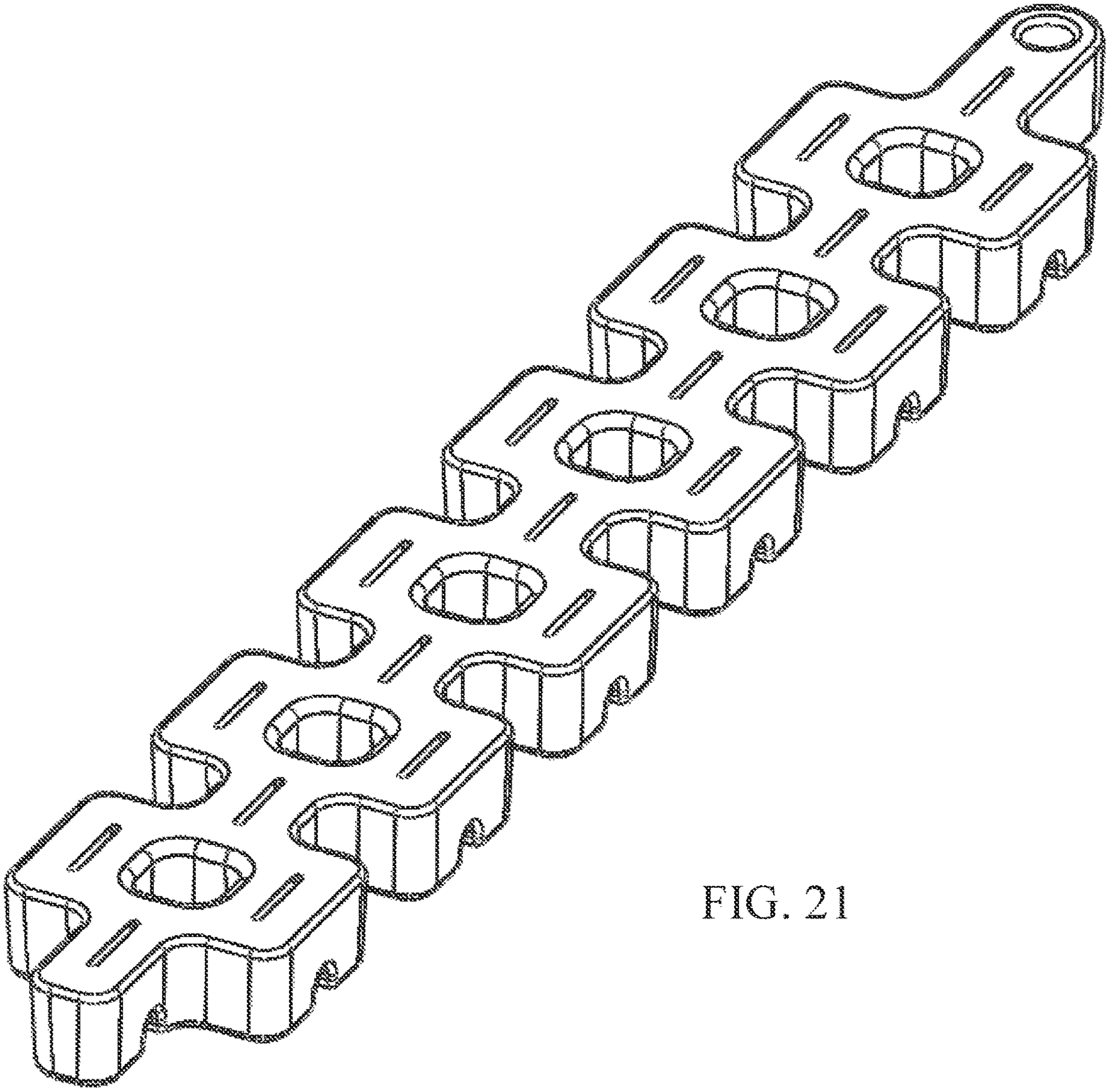
FIG. 21 is a top front perspective view of a second staple holding device, in accordance with the present disclosure.
Figure 22:
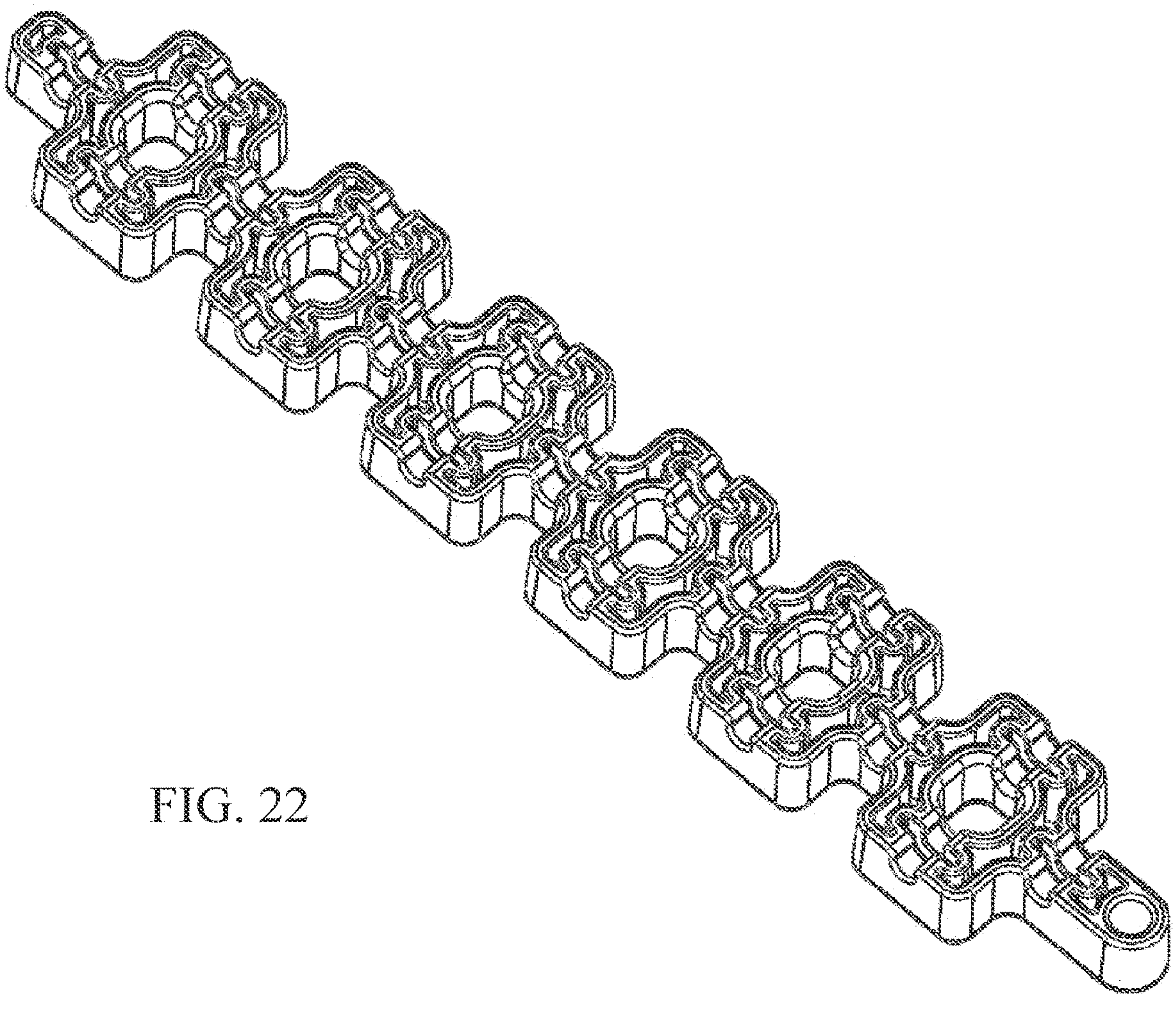
FIG. 22 is a bottom perspective view of FIG. 21.
Figure 23:
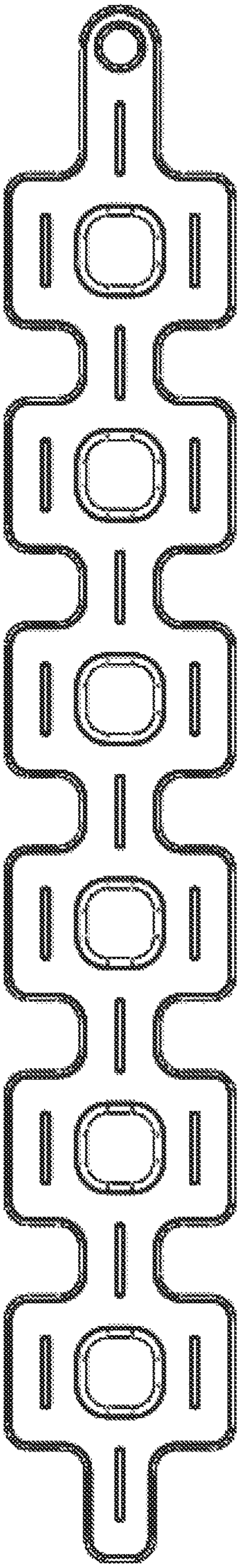
FIG. 23 is a top view of FIG. 21.
Figure 24:
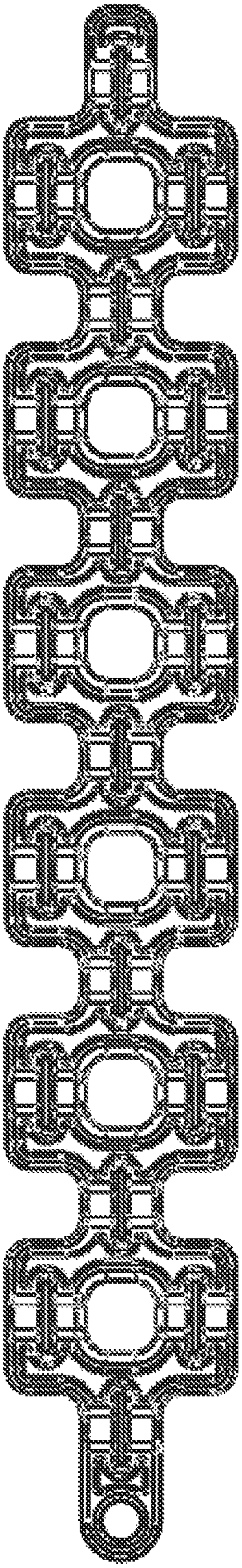
FIG. 24 is a bottom view of FIG. 21.
Figure 25:
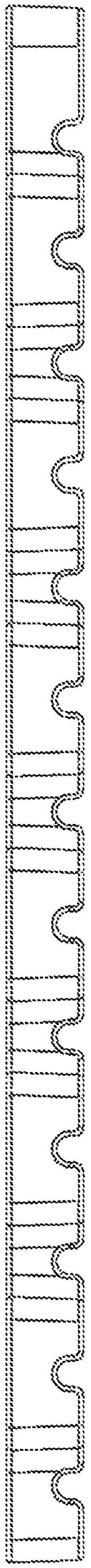
FIG. 25 is a first side view of FIG. 21.
Figure 26:
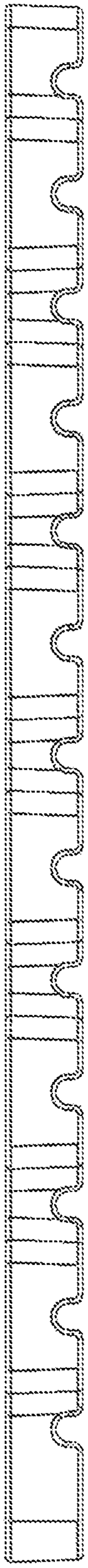
FIG. 26 is a second side view of FIG. 21.
Figure 27:
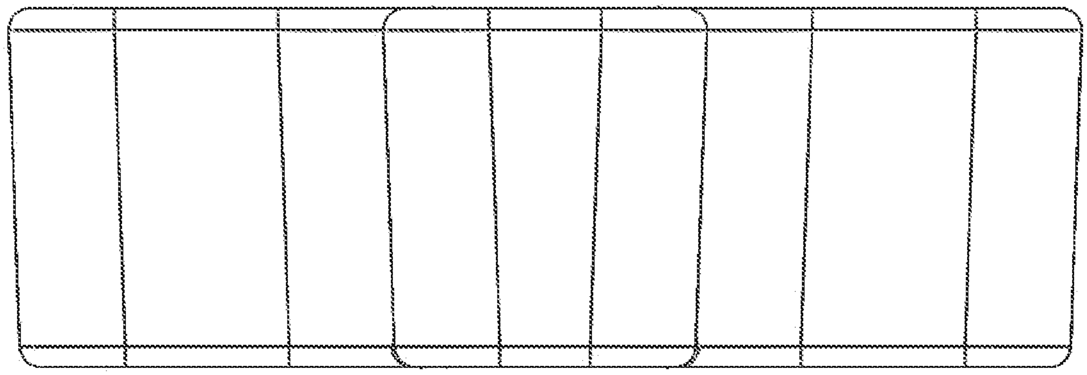
FIG. 27 is a front of FIG. 21.
Figure 28:
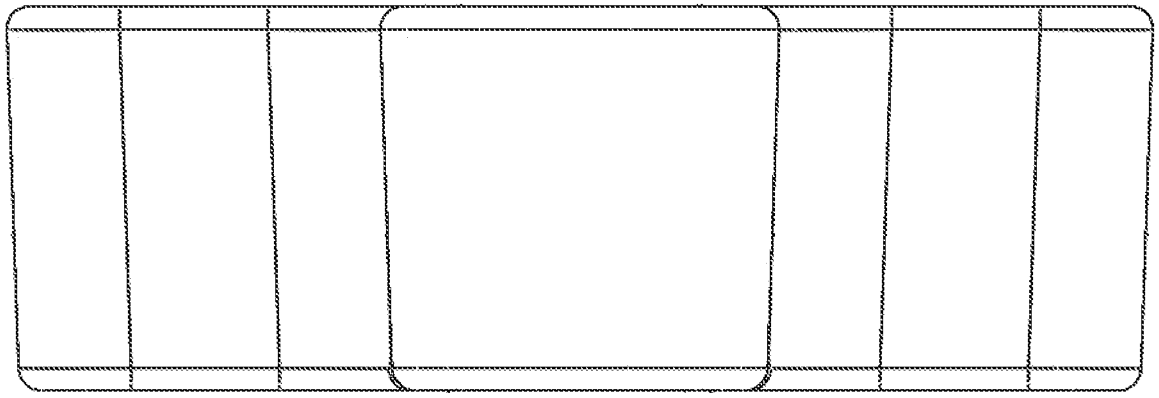
FIG. 28 is a back of FIG. 21.

In various embodiments and with reference to FIGS. 11-12, staple stick 1100 may be configured as a semi-circular staple stick. In this regard, body 1102 may approximate a portion of the surface of a wooden utility pole. Staple stick 1100 may include a plurality of staple channels 1110 distributed about the outer surface of staple stick 1100. Moreover, and as described herein, each staple channel 1110 may comprise a wire guide channel 1112. Moreover, when installed in staple stick 1100, staples 32 may be sufficiently spaced from one another to allow each staple 32 to be individually stuck by hammer 10 without interference from an adjacent staple.

After reading the present disclosure, one of ordinary skill will appreciate that the various seal features described herein may be combined in various ways without departing from the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A staple stick, comprising:

a body defining a first axis A-A, a second axis B-B, and a third axis C-C along the body between a first end of the body and a second end of the body, wherein the first axis A-A is defined on a centerline of the body along a length of the body, wherein the second axis B-B is defined along a width of the body, wherein the third axis C-C is defined along a height of the body, wherein the first axis A-A, the second axis B-B, and the third axis C-C are perpendicular to one another, wherein a first plurality of staple channels are defined through the body in a first series along the first axis A-A, wherein a second plurality of staple channels are defined through the body in a second series along a fourth axis that is parallel to the first axis A-A, wherein the body includes a through hole at the first end, wherein each of the staple channels includes one of a plurality of wire guide grooves defined in a bottom of the body, and wherein a first width of a first wire guide groove of the plurality of wire guide grooves is less than a second width of a first staple channel of the first plurality of staple channels.

2. The staple stick of claim 1, wherein the first wire guide groove defines an archway.

3. The staple stick of claim 2, wherein the archway is defined by a set of parallel walls extending from a pair of terminal ends of a semicircle.

4. The staple stick of claim 3, wherein the semicircle defines a diameter between the terminal ends.

5. The staple stick of claim 4, wherein the diameter approximates a size of a ground wire.

6. The staple stick of claim 4, wherein the first wire guide groove is elastically deformable to accommodate ground wires with a plurality of diameters.

7. The staple stick of claim 1, wherein the staple stick is made of an elastomeric material.

8. The staple stick of claim 1, wherein the first plurality of staple channels include the first staple channel, a second staple channel, and a third staple channel.

9. The staple stick of claim 8, wherein the first staple channel and the second staple channel are disposed parallel to one another.

10. The staple stick of claim 8, wherein the third staple channel lies in a plane between the first staple channel and the second staple channel.

11. The staple stick of claim 8, wherein the first wire guide groove and a second wire guide groove of the plurality of wire guide grooves are concentric.

12. The staple stick of claim 8, wherein the first wire guide groove is parallel to a second wire guide groove of the third staple channel.

* * * * *